(12) United States Patent
Miao et al.

(10) Patent No.: US 8,471,967 B2
(45) Date of Patent: Jun. 25, 2013

(54) EYEPIECE FOR NEAR-TO-EYE DISPLAY WITH MULTI-REFLECTORS

(75) Inventors: Xiaoyu Miao, Sunnyvale, CA (US); Babak Amirparviz, Mountain View, CA (US)

(73) Assignee: Google Inc., Mountain View, CA (US)

( * ) Notice: Subject to any disclaimer, the term of this patent is extended or adjusted under 35 U.S.C. 154(b) by 181 days.

(21) Appl. No.: 13/184,186

(22) Filed: Jul. 15, 2011

(65) Prior Publication Data

US 2013/0016292 A1 Jan. 17, 2013

(51) Int. Cl.
*G02F 1/1335* (2006.01)

(52) U.S. Cl.
USPC .................................. 349/11; 349/9

(58) Field of Classification Search
USPC .................... 349/11, 9, 96, 117, 113, 114, 65, 349/57, 62; 359/489.08, 634, 633; 353/34, 353/20
See application file for complete search history.

(56) References Cited

U.S. PATENT DOCUMENTS

| | | |
|---|---|---|
| 4,711,512 A | 12/1987 | Upatnieks |
| 5,076,664 A | 12/1991 | Migozzi |
| 5,093,567 A | 3/1992 | Staveley |
| 5,539,422 A | 7/1996 | Heacock et al. |
| 5,696,521 A | 12/1997 | Robinson et al. |
| 5,715,337 A | 2/1998 | Spitzer et al. |
| 5,771,124 A | 6/1998 | Kintz et al. |
| 5,815,126 A | 9/1998 | Fan et al. |
| 5,844,530 A | 12/1998 | Tosaki |
| 5,886,822 A | 3/1999 | Spitzer |
| 5,896,232 A | 4/1999 | Budd et al. |
| 5,943,171 A | 8/1999 | Budd et al. |
| 5,949,583 A | 9/1999 | Rallison et al. |
| 6,023,372 A | 2/2000 | Spitzer et al. |
| 6,091,546 A | 7/2000 | Spitzer |
| 6,172,657 B1 | 1/2001 | Kamakura et al. |
| 6,201,629 B1 | 3/2001 | McClelland et al. |
| 6,204,974 B1 | 3/2001 | Spitzer |

(Continued)

FOREIGN PATENT DOCUMENTS

| | | |
|---|---|---|
| GB | 2272980 A | 6/1994 |
| JP | 2007-156096 A1 | 6/2007 |
| WO | WO96/05533 A1 | 2/1996 |

OTHER PUBLICATIONS

Levola, Tapani, "Diffractive Optics for Virtual Reality Displays", Academic Dissertation, Joensuu 2005, University of Joensuu, Department of Physics, Vaisala Laboratory, 26 pages.

(Continued)

*Primary Examiner* — Thoi Duong
(74) *Attorney, Agent, or Firm* — Blakely Sokoloff Taylor & Zafman LLP

(57) ABSTRACT

An eyepiece for a head mounted display includes an illumination module, an end reflector, a viewing region, and a polarization rotator. The illumination module includes an image source for launching computer generated image ("CGI") light along a forward propagating path. The end reflector is disposed at an opposite end of the eyepiece from the illumination module to reflect the CGI back along a reverse propagation path. The viewing region is disposed between the illumination module and the end reflector. The viewing region includes a polarizing beam splitter ("PBS") and non-polarizing beam splitter ("non-PBS") disposed between the PBS and the end reflector. The viewing region redirects the CGI light from the reverse propagation path out of an eye-ward side of the eyepiece. The polarization rotator is disposed in the forward and reverse propagation paths of the CGI light between the viewing region and the end reflector.

24 Claims, 6 Drawing Sheets

U.S. PATENT DOCUMENTS

| | | | |
|---|---|---|---|
| 6,222,677 B1 | 4/2001 | Budd et al. |
| 6,349,001 B1 | 2/2002 | Spitzer |
| 6,353,492 B2 | 3/2002 | McClelland et al. |
| 6,353,503 B1 | 3/2002 | Spitzer et al. |
| 6,356,392 B1 | 3/2002 | Spitzer |
| 6,384,982 B1 | 5/2002 | Spitzer |
| 6,538,799 B2 | 3/2003 | McClelland et al. |
| 6,618,099 B1 | 9/2003 | Spitzer |
| 6,690,516 B2 | 2/2004 | Aritake et al. |
| 6,701,038 B2 | 3/2004 | Rensing et al. |
| 6,723,354 B1 | 4/2004 | Ruseler-van Embden et al. |
| 6,724,354 B1 | 4/2004 | Spitzer et al. |
| 6,738,535 B2 | 5/2004 | Kanevsky et al. |
| 6,747,611 B1 | 6/2004 | Budd et al. |
| 6,829,095 B2 | 12/2004 | Amitai |
| 6,879,443 B2 | 4/2005 | Spitzer et al. |
| 7,158,096 B1 | 1/2007 | Spitzer |
| 7,242,527 B2 | 7/2007 | Spitzer et al. |
| 7,391,573 B2 | 6/2008 | Amitai |
| 7,457,040 B2 | 11/2008 | Amitai |
| 7,576,916 B2 | 8/2009 | Amitai |
| 7,577,326 B2 | 8/2009 | Amitai |
| 7,643,214 B2 | 1/2010 | Amitai |
| 7,663,805 B2 | 2/2010 | Zaloum et al. |
| 7,672,055 B2 | 3/2010 | Amitai |
| 7,724,441 B2 | 5/2010 | Amitai |
| 7,724,442 B2 | 5/2010 | Amitai |
| 7,724,443 B2 | 5/2010 | Amitai |
| 7,843,403 B2 | 11/2010 | Spitzer |
| 7,900,068 B2 | 3/2011 | Weststrate et al. |
| 8,004,765 B2 | 8/2011 | Amitai |
| 8,098,439 B2 | 1/2012 | Amitai et al. |
| 2003/0090439 A1 | 5/2003 | Spitzer et al. |
| 2005/0174651 A1 | 8/2005 | Spitzer et al. |
| 2006/0192306 A1 | 8/2006 | Giller et al. |
| 2006/0192307 A1 | 8/2006 | Giller et al. |
| 2008/0219025 A1 | 9/2008 | Spitzer et al. |
| 2009/0122414 A1 | 5/2009 | Amitai |
| 2010/0046070 A1 | 2/2010 | Mukawa |
| 2010/0103078 A1 | 4/2010 | Mukawa et al. |
| 2010/0149073 A1 | 6/2010 | Chaum et al. |
| 2010/0157433 A1 | 6/2010 | Mukawa et al. |
| 2010/0278480 A1 | 11/2010 | Vasylyev et al. |
| 2011/0213664 A1 | 9/2011 | Osterhout et al. |

OTHER PUBLICATIONS

Mukawa, Hiroshi et al., "Distinguished Paper: A Full Color Eyewear Display using Holographic Planar Waveguides", SID Symposium Digest of Technical Papers—May 2008—vol. 39, Issue 1, pp. 89-92.
PCT/US2012/041156; PCT International Search Report and Written Opinion of the International Searching Authority, mailed Jan. 25, 2013, 10 pages.

EYEPIECE FOR NEAR-TO-EYE DISPLAY WITH MULTI-REFLECTORS

TECHNICAL FIELD

This disclosure relates generally to the field of optics, and in particular but not exclusively, relates to near-to-eye optical systems.

BACKGROUND INFORMATION

A head mounted display ("HMD") is a display device worn on or about the head. HMDs usually incorporate some sort of near-to-eye optical system to emit a light image within a few centimeters of the human eye. Single eye displays are referred to as monocular HMDs while dual eye displays are referred to as binocular HMDs. Some HMDs display only a computer generated image ("CGI"), while other types of HMDs are capable of superimposing CGI over a real-world view. This latter type of HMD can serve as the hardware platform for realizing augmented reality. With augmented reality the viewer's image of the world is augmented with an overlaying CGI, also referred to as a heads-up display ("HUD").

HMDs have numerous practical and leisure applications. Aerospace applications permit a pilot to see vital flight control information without taking their eye off the flight path. Public safety applications include tactical displays of maps and thermal imaging. Other application fields include video games, transportation, and telecommunications. There is certain to be new found practical and leisure applications as the technology evolves; however, many of these applications are limited due to the cost, size, field of view, and efficiency of conventional optical systems used to implemented existing HMDs.

BRIEF DESCRIPTION OF THE DRAWINGS

Non-limiting and non-exhaustive embodiments of the invention are described with reference to the following figures, wherein like reference numerals refer to like parts throughout the various views unless otherwise specified.

DETAILED DESCRIPTION

Embodiments of a system, apparatus, and method of operation for a head mounted display ("HMD") eyepiece having an expanded eyebox are described herein. In the following description numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Figure 1:
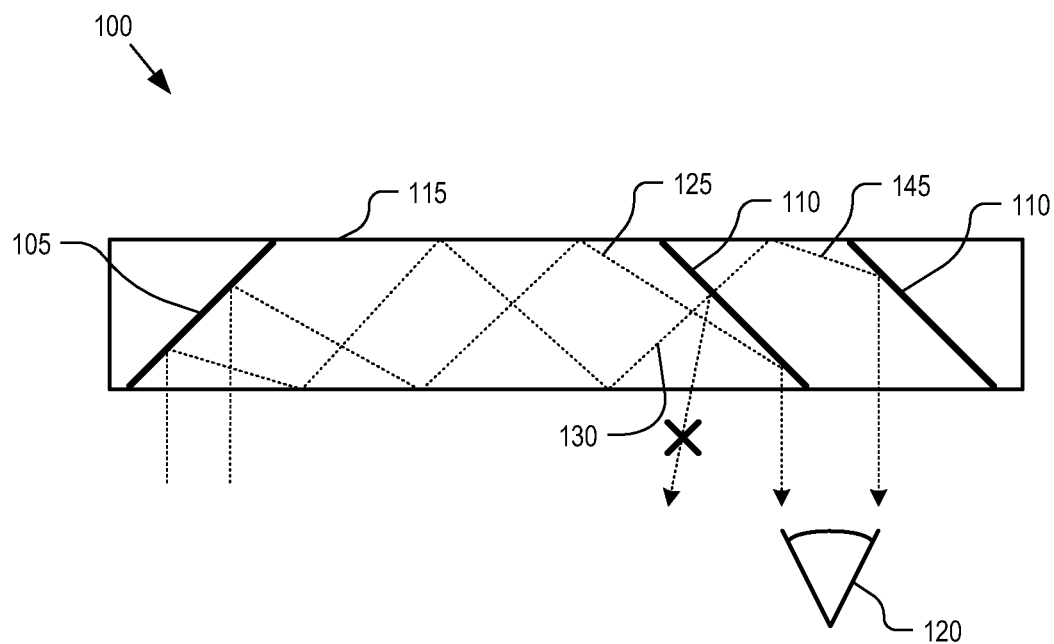
FIG. 1 illustrates a conventional near-to-eye optical system using angle sensitive dichroic mirrors.

FIG. 1 illustrates a conventional near-to-eye optical system 100 using angle sensitive dichroic mirrors. Optical system 100 includes an in-coupling mirror 105 and out-coupling dichroic minors 110 disposed within a waveguide 115. This system uses collimated input light from virtual images placed at infinity and using total internal reflection ("TIR") to guide the input light down waveguide 115 towards out-coupling dichroic minors 110. In order to produce a useful image at eye 120, each incident angle of input light should correspond to a single output angle of emitted light. Since light can potentially reflect off out-coupling dichroic minors 110 on either a downward trajectory (ray segments 125) or an upward trajectory (ray segments 130), each input angle can potentially result in multiple output angles, thereby destroying the output image. To overcome this problem, optical system 100 uses angle sensitive dichroic mirrors 110 that pass light with incidence sufficiently close to normal while reflecting light having a sufficiently oblique incidence. However, the nature of dichroic minors 110 that passes some incident angles while reflecting others, limits the field of view of optical system 100 and reduces the optical efficiency of the system. In addition, these dichroic mirror coatings do not provide sharp angular cutoffs, resulting in ghosting effects. Lastly the angle sensitive dichroic mirror coating requires a complicated and customized coating design, which is not cost effective.

Figure 2:
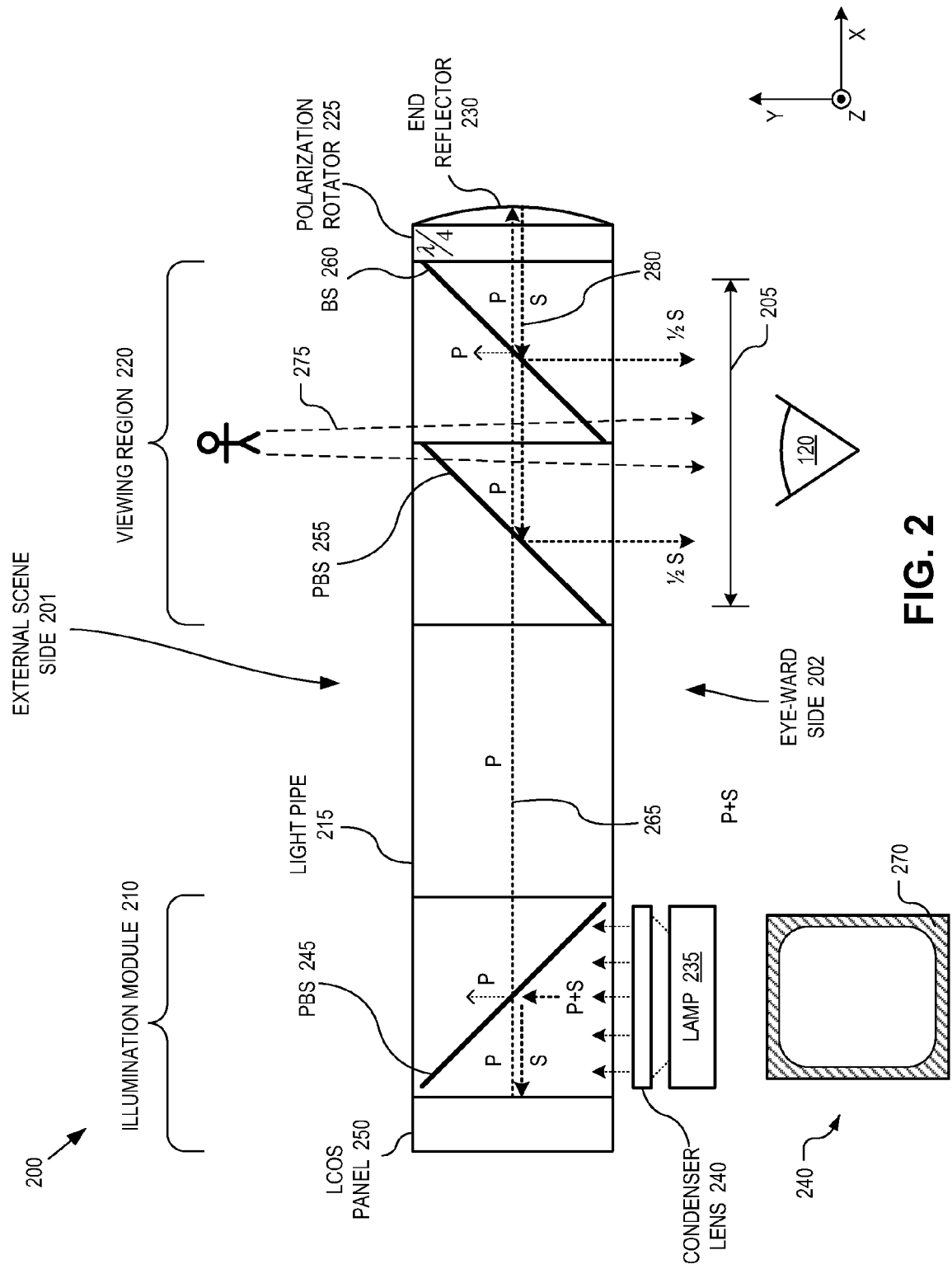
FIG. 2 is a top cross-sectional view of an eyepiece including dual reflective surfaces in the viewing region to expand the eyebox, in accordance with an embodiment of the disclosure.
Figure 3:
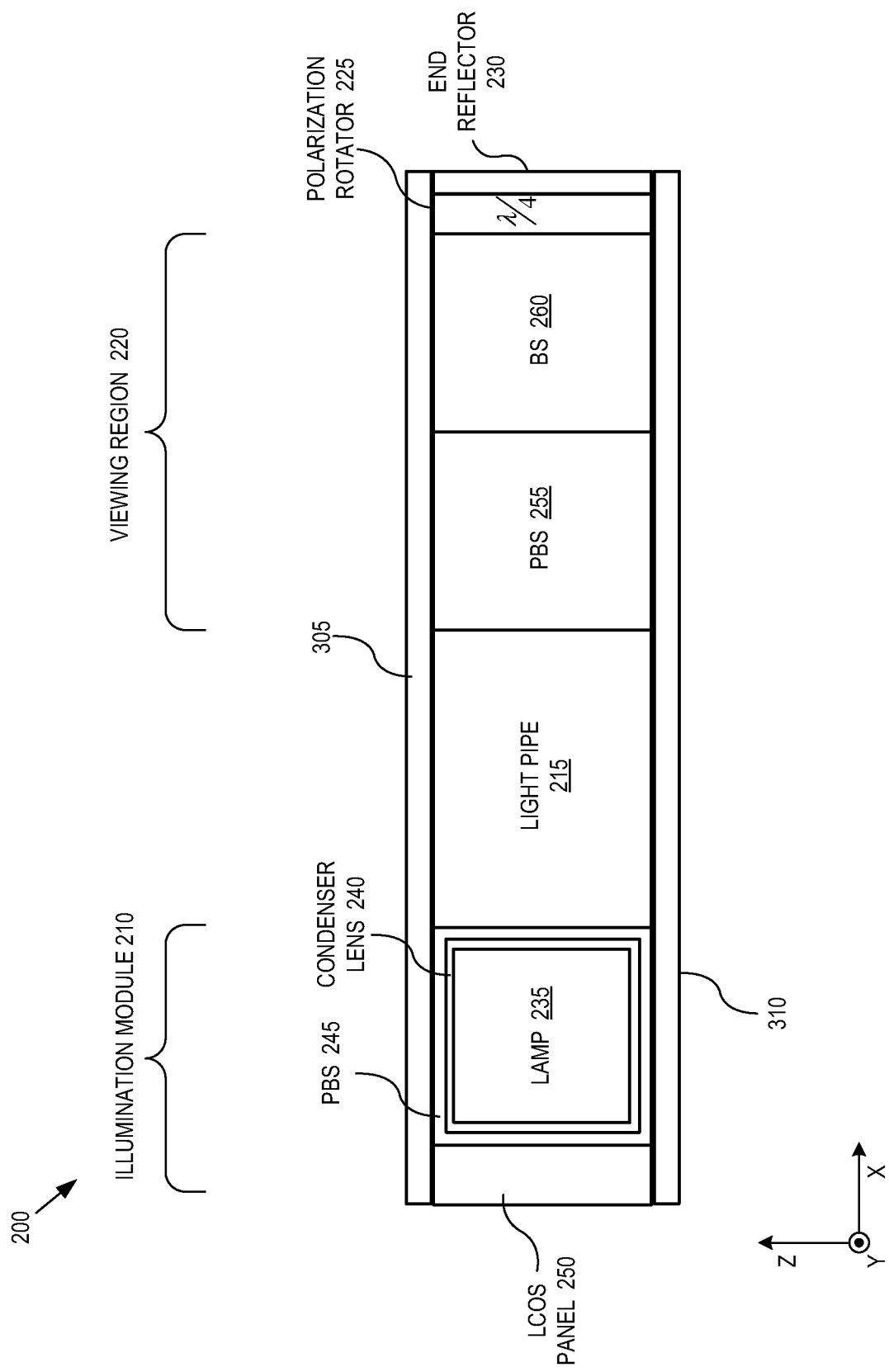
FIG. 3 is a side view of the eyepiece including dual reflective surfaces in the viewing region, in accordance with an embodiment of the disclosure.

FIGS. 2 and 3 illustrate an eyepiece 200 including dual reflective surfaces in the viewing region to expand an eyebox 205 associated with the eyepiece, in accordance with an embodiment of the disclosure. FIG. 2 illustrates a top cross-sectional view of eyepiece 200 while FIG. 3 illustrates a side view of the same. The illustrated embodiment of eyepiece 200 includes an illumination module 210, a light pipe 215, a viewing region 220, a polarization rotator 225, and an end reflector 230. The illustrated embodiment of illumination module 210 includes a lamp 235, a condenser lens 240, a polarizing beam splitter ("PBS") 245, and a liquid crystal on silicon ("LCOS") panel 250. The illustrated embodiment of viewing region 220 includes a PBS 255 and a non-polarizing beam splitter ("non-PBS") 260 (concisely referred to as BS 260).

Lamp 235 may be implemented using a light emitting diode ("LED") source, which illuminates LCOS panel 250 via reflection off of PBS 245. PBS 245 may be implemented as a discrete PBS block to which lamp 235, condenser lens 240, and LCOS panel 250 are bonded. PBS 245 operates to substantially pass light of a first linear polarization (e.g., pass greater than 90% of P polarization) while substantially reflecting light of a second polarization (e.g., reflect greater than 99% of S polarization). The two linear polarizations are typically orthogonal linear polarizations. LCOS panel 250 imparts image data onto the illumination light output by lamp 235 to output computer generated image ("CGI") light via selective reflection by an array of image pixels. Reflection by LCOS panel 250 rotates the polarization of the incident lamp light by 90 degrees.

LCOS panel 250 is disposed on the opposite side of eyepiece 200 from end reflector 230 in an opposing configuration such that it is directly facing end reflector 230. Upon reflection of the incident lamp light, the CGI light propagates down eyepiece 200 along a forward propagation path 265. In one embodiment, the CGI light is directed down eyepiece 200 along forward propagation path 265 without need of total internal reflection ("TIR"). In other words, the cross sectional shape and divergence of the light cone formed by the CGI light is confined such that the light rays reach end reflector 230 without TIR off the sides of eyepiece 200. In one embodiment, the light cone divergence angle (e.g., 15 degrees) is controlled by condenser lens 240. In one embodiment, the light cone cross-sectional shape is also controlled by a blackout film 270 patterned onto condenser lens 240. In other embodiments, blackout film 270 may be disposed elsewhere, such as at the interface between the cube structure of PBS 245 and LCOS panel 250, between the box volume structure of PBS 245 and light pipe 215, on slanted PBS 245 itself, or otherwise.

Figure 5:
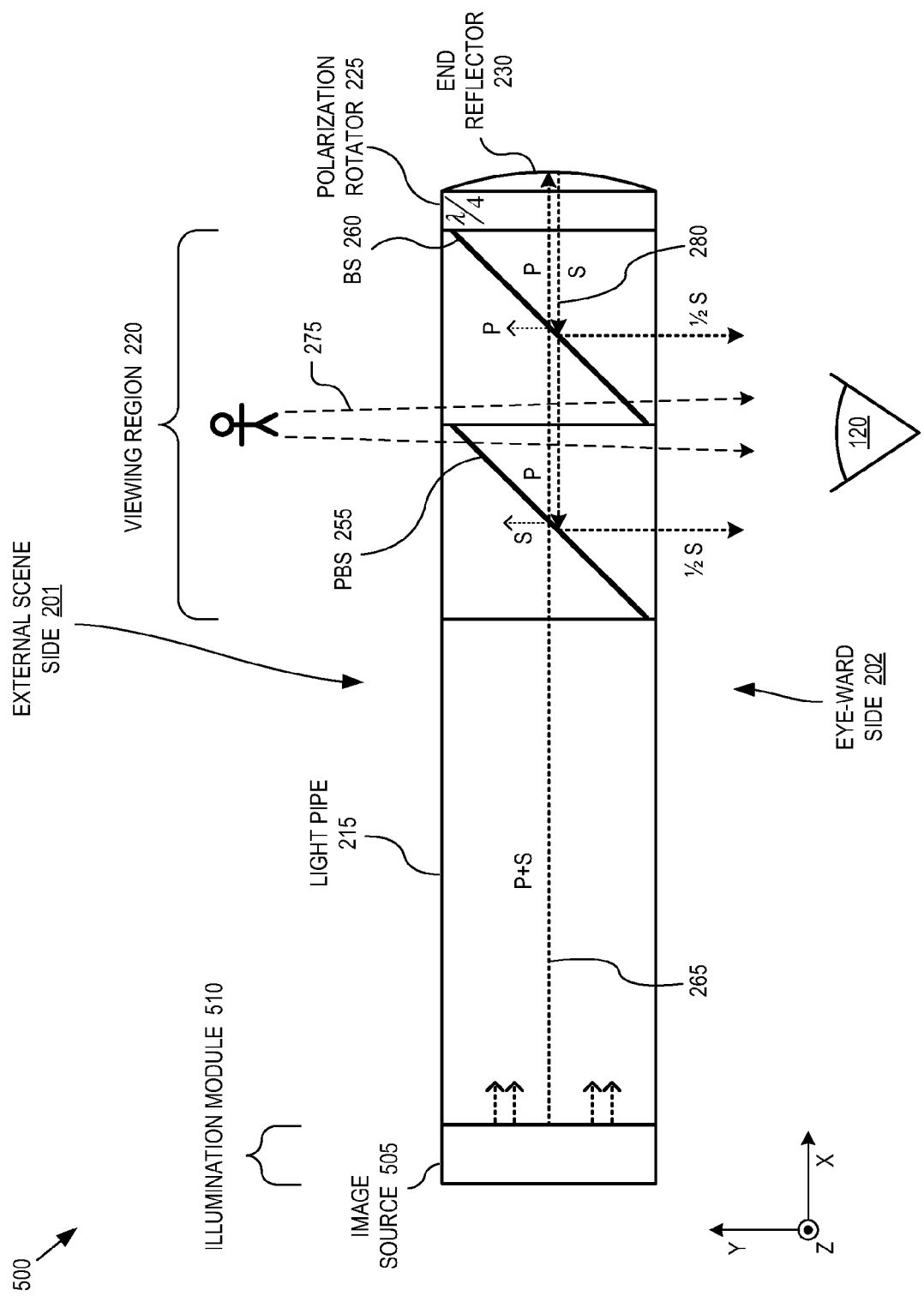
FIG. 5 is a top cross-sectional view of an eyepiece including dual reflective surfaces and an image source that directly opposes an end reflector, in accordance with an embodiment of the disclosure.

While FIGS. 2 and 3 illustrate illumination module 210 implemented using lamp 235 and LCOS panel 250 to implement an image source; however, various other image source technologies may be used. FIG. 5 discussed below illustrates another image source implementation example.

Light pipe 215 is disposed between illumination module 210 and viewing region 220. Light pipe 215 has a transparent structure to permit the CGI light to pass through along forward propagation path 265. Light pipe 215 maybe fabricated of a solid transparent material (e.g., glass, quartz, acrylic, clear plastic, PMMA, ZEONEX-E48R, etc.) or be implemented as a solid housing having an inner air gap through which the CGI light passes. In one embodiment, light pipe 215 has a length (as measured parallel to forward propagation path 265) selected such that the focal plane of end reflector 230 substantially coincides with an emission aperture of LCOS panel 250. To achieve focal plane alignment with the emission aperture of LCOS panel 250, both the length of light pipe 215 and the radius of curvature of end reflector 230 may be selected in connection with each other.

The illustrated embodiment of viewing region 220 includes dual reflectors, which include PBS 255 and non-PBS 260. In one embodiment, the dual reflectors are substantially parallel partially reflective obliquely situated planes. In one embodiment, viewing region is partially transparent, which permits external scene light 275 to pass through external scene side 201 and eye-ward side 202 of eyepiece 200 to reach eye 120. A partially transparent embodiment facilitates an augmented reality ("AR") where the CGI light is superimposed over external scene light 275 to the user eye 120. In another embodiment, viewing region 220 is substantially opaque (or even selectively opaque), which facilitates a virtual reality ("VR") that immerses the user in the virtual environment displayed by the CGI light.

PBS 255 is configured to pass the same linear polarization (e.g., P polarization) as PBS 245, while reflecting the other linear polarization (e.g., S polarization). Non-PBS 260 (or BS 260) passes both linear polarizations, but only passes a portion of each linear polarization while reflecting a portion of both linear polarizations. In the illustrated embodiment, non-PBS 260 is a 50/50 beam splitter that reflects 50% and passes 50% of incident light. The use of dual reflective elements in viewing region 220 expands eyebox 205 versus a viewing region only having a single obliquely orientated reflector. Eyebox 205 is defined by the combined projections of PBS 255 and non-PBS 260 (i.e., BS 260) onto eye-ward side 202. Thus, the inclusion of multiple reflective elements in viewing region 220 permits the width (in the Y axis) of eyepiece 200 to be shrunk to achieve a desired form factor while maintaining an acceptable eyebox size. For example, the Y axis width of eyepiece 200 maybe half the Z axis height, or even less. In one embodiment, the Y by Z dimensions of eyepiece 200 are approximately 5 mm by 10 mm. The overall length of eyepiece 200 may be selected based upon the temple-to-eye separation distance of a typical user and/or the focal plane distance of end reflector 230. Of course other ratios and dimensions may be used.

In other embodiments, additional non-PBS reflectors may be disposed between PBS 255 and polarization rotator 225 to further expand eyebox 205; however, in these multi-non-PBS configurations, each non-PBS will have a varying reflectivity to achieve uniform emission intensity of the CGI light towards eye 120 (e.g., 67% and 33% reflectivities in the case of two non-PBS reflectors).

In the illustrated embodiment, polarization rotator 225 is a quarter wave-plate polarization rotator. The CGI light is rotated 45 degrees along forward propagation path 265 and another 45 degrees along reverse propagation path after reflection by end reflector 230 for a total of 90 degrees of polarization rotation. In the illustrated embodiment, end reflector 230 both reflects and collimates the CGI light such that the CGI light traveling along reverse propagation path 280 is collimated and the image is virtually placed at or near infinity. As previously stated, the focal plane of end reflector 230 may be configured to coincide with the emission aperture of the image source disposed in illumination module 210. Collimating the CGI light permits eye 120 to focus on the CGI light emitted out eye-ward side 202 in a near-to-eye configuration (e.g., eyepiece 200 placed within 10 cm of eye 120 and typically at or less than 5 cm of eye 120). The CGI light is directed towards eye 120 due to the oblique orientation (e.g., approximately 45 degrees relative to sides 201 and 202) of PBS 255 and non-PBS 260.

Referring to both FIGS. 2 and 3, eyepiece 200 may be fabricated of a series of optically aligned but independent modules. For example, PBS 245, light pipe 215, PBS 255, and non-PBS 260 may all be fabricated as independent physical elements that are jointed together. In one embodiment, PBS 255 and non-PBS 260 may be integrated into one physical component with the two reflective surfaces coated onto opposite sides of this single physical component. These independent physical elements (e.g., volume boxes, cubes, etc.) may share a common cross-sectional shape facilitating a butt connection at planar interface surfaces. In one embodiment, these independent physical elements may be disposed on a single substrate (e.g., either one of upper substrate 305 or lower substrate 310) or even sandwiched between both upper and lower substrates 305 and 310. One or both of substrates 305 and 310 facilitate optical alignment on a planar surface. Furthermore, fine tuning of the optical alignment between the focal plane of end reflector 230 and the emission aperture of LCOS panel 250 can be achieved during placement of the physical components on one or both of substrates 305 and 310. For example, air gaps can be introduced between light pipe 215 and PBS 245 and/or PBS 255 to achieve the correct separation distance between end reflector 230 and LCOS panel 250.

Figure 4:
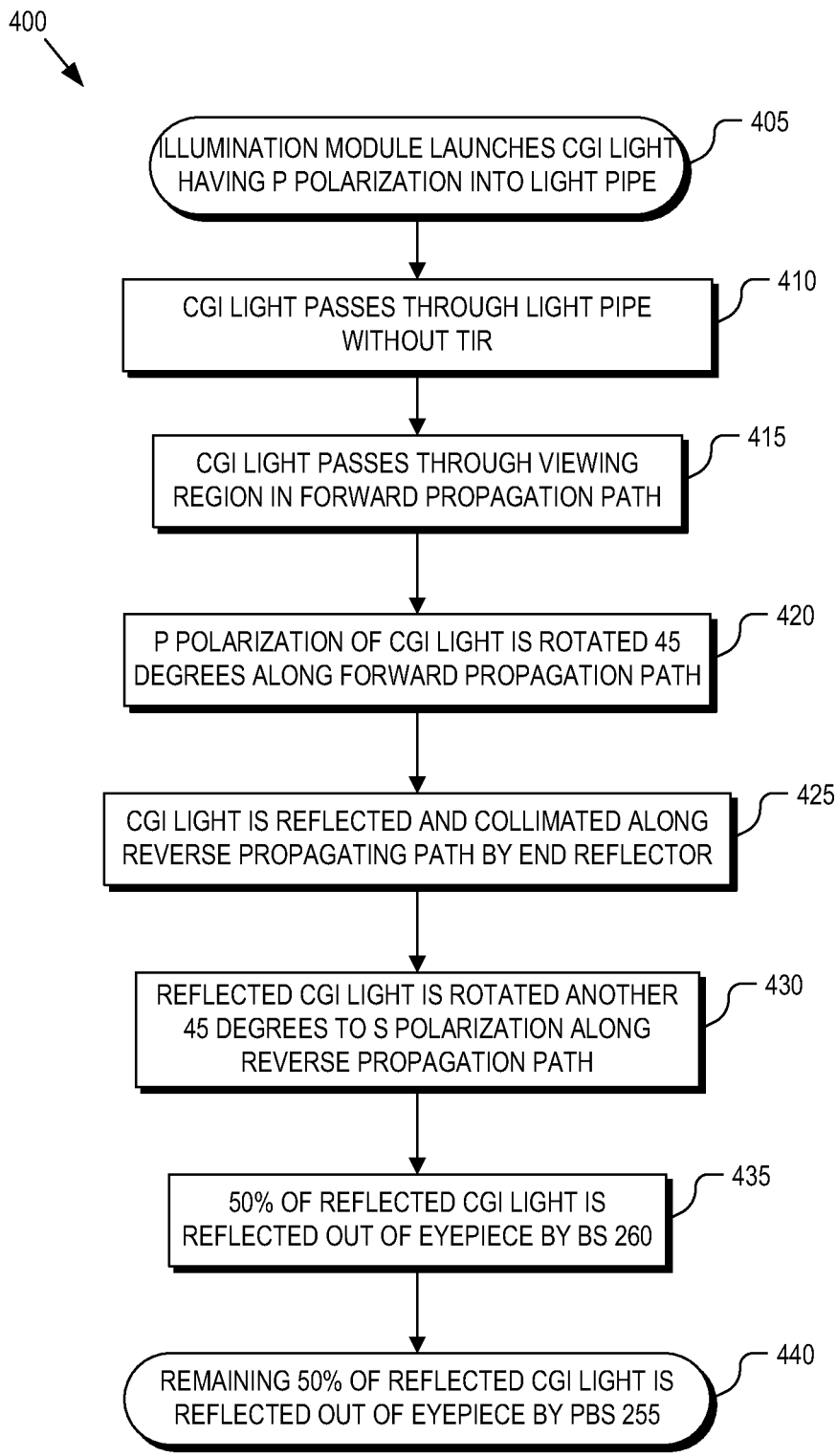
FIG. 4 is a flow chart illustrating a process of operation of the eyepiece to deliver a near-to-eye image to a user, in accordance with an embodiment of the disclosure.

FIG. 4 is a flow chart illustrating a process 400 of operation of eyepiece 200 to deliver a near-to-eye image to a user, in accordance with an embodiment of the disclosure. The order in which some or all of the process blocks appear in process 400 should not be deemed limiting. Rather, one of ordinary skill in the art having the benefit of the present disclosure will understand that some of the process blocks may be executed in a variety of orders not illustrated, or even in parallel.

In a process block 405, illumination module launches the CGI light having the P polarization into light pipe 215 traveling along forward propagation path 265. In the embodiment illustrated in FIG. 2, the P polarized CGI light is generated as follows. Lamp 235 generates un-polarized light having both P and S polarizations. The divergence of the un-polarized light emitted from lamp 235 is reduced and the beam cross-section limited by condenser lens 240. The un-polarized light is then directed into the side of the physical block or module housing PBS 245. PBS 245 passes the P polarization components while reflecting the S polarization components. Since PBS 245 is obliquely situated relative to lamp 235, the reflected S polarization components are directed onto LCOS panel 250. LCOS panel 250 modulates image data onto the incident lamp light by selectively activating image pixels within the LCOS panel. When an image pixel is activated, it reflects it portion of the lamp light. In so doing, the reflected CGI light has its polarization rotated by 90 degrees to the P polarization. Since PBS 245 is substantially transparent to P polarized light, the reflected CGI light passes through PBS 245 substantially undisturbed towards light pipe 215 along forward propagation path 265.

In a process block 410, the CGI light passes through light pipe 215. In one embodiment, light pipe 215 merely provides a separation offset between the image source (e.g., LCOS panel 250) and end reflector 230 and does not operate to confine or guide the light wave. Thus, in these embodiments, the CGI light passes through light pipe 215 without TIR and without external surface reflections.

In a process block 415, the CGI light passes through viewing region 220 along forward propagation path 265. Since PBS 255 is configured to substantially pass P polarized light, the CGI light passes through PBS 255 substantially without being affected. In contrast, in the illustrated embodiment non-PBS 260 is a 50/50 beam splitter and therefore 50% of the CGI light is reflected towards external scene side 201 while the other 50% passes through towards polarization rotator 225.

In a process block 420, the CGI light then passes through polarization rotator 225 along forward propagation path 265. In so doing, the polarization of the CGI light is rotated by 45 degrees since the illustrated embodiment of polarization rotator 225 is a quarter wave-plate rotator.

In a process block 425, the CGI light is reflected back along reverse propagation path 280 by end reflector 230. In one embodiment, end reflector 230 is a collimating reflector. Thus, in this embodiment, the CGI light travelling along reverse propagation path 280 is substantially collimated light. Collimating the CGI light has an effect of virtually displacing the CGI image at or near infinity thereby enabling the human eye 120 to bring the CGI image into focus. Importantly, collimating the CGI light reduces or eliminates image ghosting created by reflections off of the parallel dual reflectors.

In a process block 430, the reflected CGI light traveling along reverse propagation path 280 once again passes through polarization rotator 225, causing the CGI light to be rotated another 45 degrees for a total of 90 degrees from the forward and reverse propagation paths. Thus, after passing through polarization rotator 225 for the second time, the CGI light has an S polarization.

In a process block 435, half of the CGI light having the S polarization is reflected by non-PBS 260 and redirected out of eyepiece 200 through eye-ward side 202 towards eye 120. The remaining half of the CGI light continues to PBS 255, which is configured to reflect substantially all S polarization light. Therefore, the remaining CGI light is reflected by PBS 255 and redirected out of eyepiece 200 through eye-ward side 202 towards eye 120 (process block 440). Since non-PBS 260 redirects 50% of the CGI light traveling along reverse propagation path 280 and PBS 255 redirects substantially all of the remaining CGI light that passes through non-PBS 260 along reverse propagation path 280, the CGI light emitted through eye-ward side 202 of eyepiece 200 in viewing region 220 has a substantially uniform intensity.

FIG. 5 is a top view of an eyepiece 500 including dual reflective surfaces and an image source 505 that directly opposes end reflector 230, in accordance with an embodiment of the disclosure. The illustrated embodiment of eyepiece 500 is similar to eyepiece 200 with the exception of changes to illumination module 510 relative to illumination module 210. Illumination module 510 includes an image source 505 that directly faces end reflector 230 at an opposing side of eyepiece 500. Image source 505 may be implemented with a variety of image source/display technologies including an organic LED ("OLED") panel, a quantum dot array, a back lit LCD, or otherwise. Since image source 505 is disposed on the distal end of eyepiece 500, illumination module 510 may not include a beam splitter or PBS.

Figure 6:
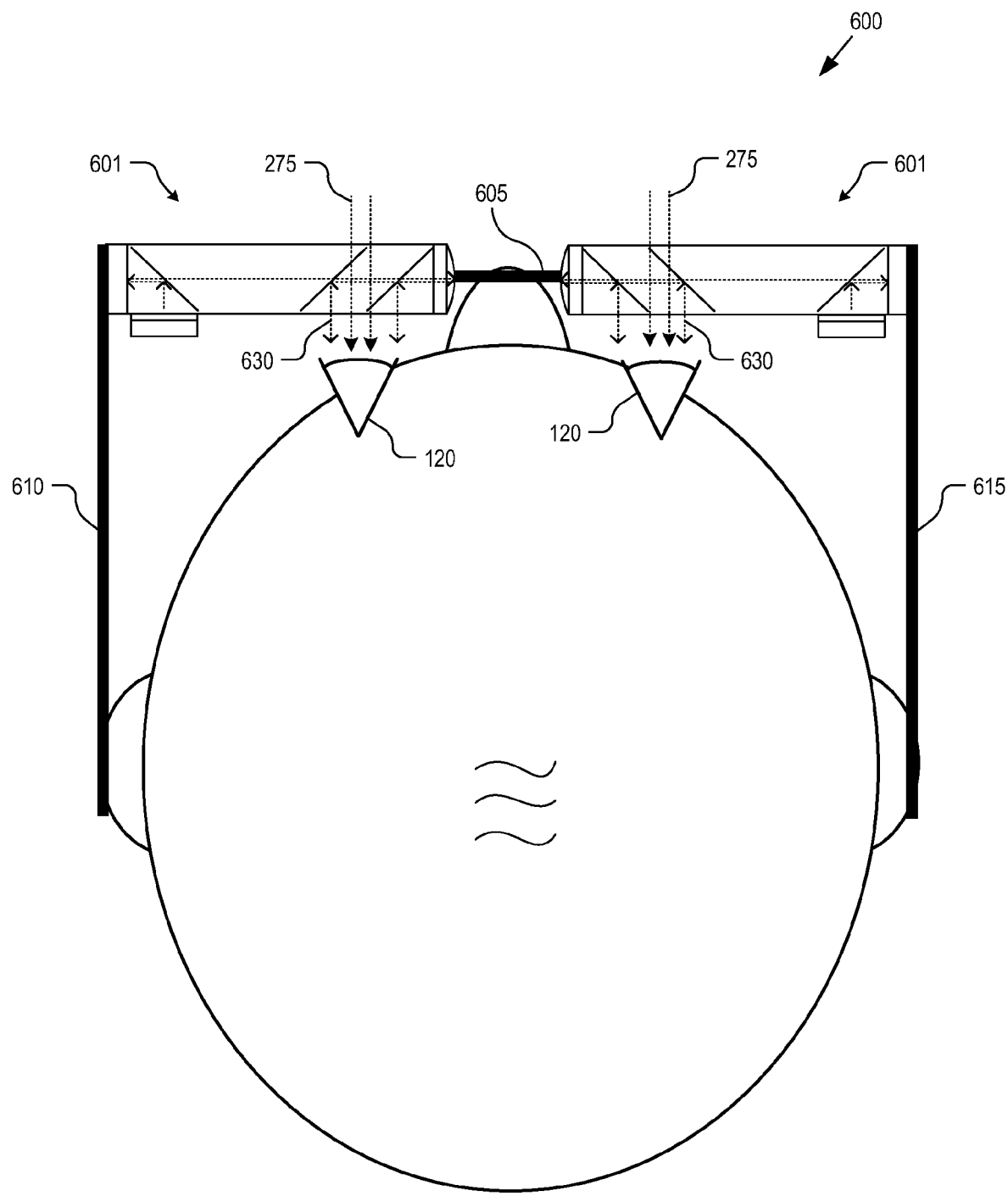
FIG. 6 is a top view of a binocular HMD implemented with eyepieces having dual reflective surfaces in the viewing region, in accordance with an embodiment of the disclosure.

FIG. 6 is a top view of a head mounted display ("HMD") 600 using a pair of near-to-eye optical systems 601, in accordance with an embodiment of the disclosure. Each near-to-eye optical system 601 may be implemented with embodiments of either eyepiece 200 or eyepiece 500, or combinations/variations thereof. The near-to-eye optical systems 601 are mounted to a frame assembly, which includes a nose bridge 605, left ear arm 610, and right ear arm 615. Although FIG. 6 illustrates a binocular embodiment, HMD 600 may also be implemented as a monocular HMD.

The two near-to-eye optical systems 601 are secured into an eye glass arrangement that can be worn on the head of a user. The left and right ear arms 610 and 615 rest over the user's ears while nose assembly 605 rests over the user's nose. The frame assembly is shaped and sized to position a viewing region 220 in front of a corresponding eye 120 of the user. Of course, other frame assemblies may be used (e.g., single member, contiguous visor, integrated headband or goggles type eyewear, etc.).

The illustrated embodiment of HMD 600 is capable of displaying an augmented reality to the user. The viewing region of each eyepiece permits the user to see a real world image via external scene light 275. Left and right (binocular embodiment) CGI light 630 may be generated by one or two CGI engines (not illustrated) coupled to a respective image source of the eyepieces. CGI light 630 is seen by the user as virtual images superimposed over the real world as an augmented reality. In some embodiments, external scene light 275 may be blocked or selectively blocked to provide a head mounted virtual reality display.

The processes explained above may be described in terms of computer software and hardware. The techniques described may constitute machine-executable instructions embodied within a tangible machine (e.g., computer) readable storage medium, that when executed by a machine will cause the machine to perform the operations described. Additionally, the processes may be embodied within hardware, such as an application specific integrated circuit ("ASIC") or the like.

A tangible machine-readable storage medium includes any mechanism that provides (i.e., stores) information in a form accessible by a machine (e.g., a computer, network device, personal digital assistant, manufacturing tool, any device with a set of one or more processors, etc.). For example, a machine-readable storage medium includes recordable/non-recordable media (e.g., read only memory (ROM), random access memory (RAM), magnetic disk storage media, optical storage media, flash memory devices, etc.).

The above description of illustrated embodiments of the invention, including what is described in the Abstract, is not intended to be exhaustive or to limit the invention to the precise forms disclosed. While specific embodiments of, and examples for, the invention are described herein for illustrative purposes, various modifications are possible within the scope of the invention, as those skilled in the relevant art will recognize.

These modifications can be made to the invention in light of the above detailed description. The terms used in the following claims should not be construed to limit the invention to the specific embodiments disclosed in the specification. Rather, the scope of the invention is to be determined entirely by the following claims, which are to be construed in accordance with established doctrines of claim interpretation.

What is claimed is:

1. An eyepiece for a head mounted display, the eyepiece comprising:
   an illumination module including an image source for launching computer generated image ("CGI") light along a forward propagating path within the eyepiece;
   an end reflector disposed at an opposite end of the eyepiece from the illumination module to reflect the CGI back along a reverse propagation path;
   a viewing region to be aligned with an eye of a user, the viewing region disposed between the illumination module and the end reflector and including a polarizing beam splitter ("PBS") and a non-polarizing beam splitter ("non-PBS") disposed between the PBS and the end reflector, the viewing region to redirect the CGI light from the reverse propagation path out of an eye-ward side of the eyepiece; and
   a polarization rotator disposed in the forward and reverse propagation paths of the CGI light between the viewing region and the end reflector.

2. The eyepiece of claim 1, wherein the non-PBS comprises a 50/50 beam splitter and wherein the PBS reflects approximately 100% of the CGI light having a first polarization and transmits approximately 100% of the CGI light having a second polarization such that a first portion of the CGI light is redirected out of the eyepiece by the non-PBS and a second portion of the CGI light is redirected out of the eyepiece by the PBS with substantially equal intensities.

3. The eyepiece of claim 1, wherein the PBS and the non-PBS are offset from each other and orientated substantially parallel to each other such that an eyebox associated with the eyepiece is extended along a lateral dimension.

4. The eyepiece of claim 3, wherein a cross-section of the eyepiece has a horizontal thickness, extending from an external scene side of the eyepiece to the eye-ward side, that is approximately half or less of a vertical height of the eyepiece.

5. The eyepiece of claim 1, wherein the viewing region further comprises:
   another non-PBS disposed between the non-PBS and the polarization rotator.

6. The eyepiece of claim 1, further comprising:
   a light pipe disposed between the illumination module and the viewing region, wherein the CGI light is directed through the light pipe without need of total internal reflection off side walls of the light pipe.

7. The eyepiece of claim 6, wherein the end reflector comprises a collimating concave minor to change the CGI light having a cone shape path along the forward propagation path to a substantially collimated path along the reverse propagation path.

8. The eyepiece of claim 6, wherein a length of the light pipe is selected in connection with a radius of curvature of the end reflector such that a focal plane of the end reflector substantially coincides with an exit aperture of the image source within the illumination module.

9. The eyepiece of claim 6, wherein the light pipe comprises a separate independent physical module from the PBS and the non-PBS, which is coupled to the PBS and the non-PBS at a planar interface surface.

10. The eyepiece of claim 1, wherein the illumination module comprises:
    an input PBS;
    a lamp disposed adjacent to the input PBS to direct illumination light onto the input PBS; and
    an liquid crystal on silicon ("LCOS") panel disposed opposing the end reflector with the input PBS in between such that the input PBS redirects the illumination light from the lamp onto the LCOS panel and the LCOS panel reflects the illumination light as the CGI light along the forward propagation path through the input PBS.

11. The eyepiece of claim 10, wherein the illumination module further comprises:
    a condenser lens disposed between the lamp and the input PBS to reduce divergence of the illumination light emitted from the lamp, the condenser lens having a light block pattern disposed thereon to confine the illumination light to a selected cross section.

12. The eyepiece of claim 1, wherein the image source comprises one of an organic light emitting diode ("OLED") panel, a quantum dot array, or a liquid crystal display ("LCD") and is mounted directly facing the end reflector at the opposite end of the eyepiece.

13. The eyepiece of claim 1, wherein the viewing region to be aligned with the eye of the user is optically transmissive to pass external scene light such that the CGI light is superimposed on the external scene light to provide an augmented reality.

14. The eyepiece of claim 1, wherein the polarization rotator comprises a quarter wave-plate polarization rotator.

15. A head mounted display ("HMD") for displaying computer generated image ("CGI") light to a user, the HMD comprising:
    an eyepiece including:
       an illumination module including an image source for launching the CGI light along a forward propagating path within the eyepiece;
       an end reflector disposed at an opposite end of the eyepiece from the illumination module to reflect the CGI back along a reverse propagation path;
       a viewing region disposed between the illumination module and the end reflector and including a polarizing beam splitter ("PBS") and a non-polarizing beam splitter ("non-PBS") disposed between the PBS and the end reflector, the viewing region to redirect the CGI light from the reverse propagation path out of an eye-ward side of the eyepiece; and
       a polarization rotator disposed in the forward and reverse propagation paths of the CGI light between the viewing region and the end reflector; and a frame assembly to support the eyepiece for wearing on a head of the user with the viewing region positioned in front of the eye of the user.

16. The HMD of claim 15, wherein the non-PBS comprises a 50/50 beam splitter and wherein the PBS reflects approximately 100% of the CGI light having a first polarization and transmits approximately 100% of the CGI light having a second polarization such that a first portion of the CGI light is redirected out of the eyepiece by the non-PBS and a second portion of the CGI light is redirected out of the eyepiece by the PBS with substantially equal intensities.

17. The HMD of claim 15, wherein a cross-section of the eyepiece has a horizontal thickness, extending from an external scene side of the eyepiece to the eye-ward side, which is approximately half or less of a vertical height of the eyepiece.

18. The HMD of claim 15, wherein the eyepiece further comprises:
a light pipe disposed between the illumination module and the viewing region, wherein the CGI light is directed through the light pipe without need of total internal reflection off side walls of the light pipe.

19. The HMD of claim 18, wherein a length of the light pipe is selected in connection with a radius of curvature of the end reflector such that a focal plane of the end reflector substantially coincides with an exit aperture of the image source within the illumination module.

20. The HMD of claim 15, wherein the illumination module comprises:
an input PBS;
a lamp disposed adjacent to the input PBS to direct illumination light onto the input PBS;
an liquid crystal on silicon ("LCOS") panel disposed opposing the end reflector with the input PBS in between such that the input PBS redirects the illumination light from the lamp onto the LCOS panel and the LCOS panel reflects the illumination light as the CGI light along the forward propagation path through the input PBS.

21. The HMD of claim 20, wherein the illumination module further comprises:
a condenser lens disposed between the lamp and the input PBS to reduce divergence of the illumination light emitted from the lamp, the condenser lens having a light block pattern disposed thereon to confine the illumination light to a selected cross section.

22. The HMD of claim 15, wherein the image source comprises one of an organic light emitting diode ("OLED") panel, a quantum dot array, or a liquid crystal display ("LCD") and is mounted directly facing the end reflector at the opposite end of the eyepiece.

23. The HMD of claim 15, wherein the HMD comprises a binocular HMD including left and right eyepieces.

24. The HMD of claim 15, wherein the HMD comprises a monocular HMD.

\* \* \* \* \*

UNITED STATES PATENT AND TRADEMARK OFFICE
CERTIFICATE OF CORRECTION

PATENT NO. : 8,471,967 B2  
APPLICATION NO. : 13/184186  
DATED : June 25, 2013  
INVENTOR(S) : Xiaoyu Miao and Babak Amirparviz Page 1 of 1

It is certified that error appears in the above-identified patent and that said Letters Patent is hereby corrected as shown below:

In the Claims:

In Column 8, line 4, (claim 7, line 2) delete "minor" and replace with -- mirror --.

Signed and Sealed this  
Third Day of September, 2013

Teresa Stanek Rea  
*Acting Director of the United States Patent and Trademark Office*